(12) United States Patent
Shim

(10) Patent No.: US 10,495,311 B2
(45) Date of Patent: Dec. 3, 2019

(54) TRANSITION PART ASSEMBLY AND COMBUSTOR INCLUDING THE SAME

(71) Applicant: DOOSAN HEAVY INDUSTRIES CONSTRUCTION CO., LTD., Gyeongsangnam-do (KR)

(72) Inventor: Young Sam Shim, Busan (KR)

(73) Assignee: Doosan Heavy Industries Construction Co., Ltd, Gyeongsangnam-do (KR)

(*) Notice: Subject to any disclaimer, the term of this patent is extended or adjusted under 35 U.S.C. 154(b) by 171 days.

(21) Appl. No.: 15/408,194

(22) Filed: Jan. 17, 2017

(65) Prior Publication Data
US 2017/0370582 A1    Dec. 28, 2017

(30) Foreign Application Priority Data
Jun. 28, 2016  (KR) .......................... 10-2016-0081029

(51) Int. Cl.
| | |
|---|---|
| F23R 3/00 | (2006.01) |
| F02C 3/14 | (2006.01) |
| F02C 7/18 | (2006.01) |
| F01D 9/02 | (2006.01) |
| F01D 25/12 | (2006.01) |

(52) U.S. Cl.
CPC .............. *F23R 3/005* (2013.01); *F01D 9/023* (2013.01); *F01D 25/12* (2013.01); *F02C 3/14* (2013.01); *F02C 7/18* (2013.01); *F23R 3/002* (2013.01); *F05D 2220/32* (2013.01); *F05D 2240/35* (2013.01); *F05D 2260/201* (2013.01); *F23R 2900/03043* (2013.01); *F23R 2900/03044* (2013.01)

(58) Field of Classification Search
CPC .......... F23R 3/002; F23R 3/005; F01D 9/023; F01D 25/12; F02C 3/14; F02C 7/18
See application file for complete search history.

(56) References Cited

U.S. PATENT DOCUMENTS

| | | | | |
|---|---|---|---|---|
| 6,484,505 | B1* | 11/2002 | Brown | .................... F23R 3/002 |
| | | | | 60/760 |
| 8,127,553 | B2* | 3/2012 | Ekkad | ........................ F23R 3/06 |
| | | | | 60/752 |

(Continued)

FOREIGN PATENT DOCUMENTS

| | | |
|---|---|---|
| EP | 2246627 A2 | 11/2010 |
| JP | 2000146186 A | 5/2000 |

(Continued)

OTHER PUBLICATIONS

An International Search Report dated Apr. 27, 2017 in connection with International patent application No. PCT/KR2017/000840.

(Continued)

*Primary Examiner* — Craig Kim
(74) *Attorney, Agent, or Firm* — Invenstone Patent, LLC (57) ABSTRACT

Disclosed herein are a transition part assembly which is improved in efficiency of cooling a high-temperature region formed on a side surface of a transition part of a gas turbine, and a combustor including the same. The transition part assembly includes a transition part, a collision sleeve, a cooling hole, and a guide which is formed inside the collision sleeve so as to guide air to a side surface of the transition part.

10 Claims, 4 Drawing Sheets

(56) References Cited

U.S. PATENT DOCUMENTS

| | | | | |
|---|---|---|---|---|
| 8,281,600 | B2* | 10/2012 | Chen | F02C 7/18 60/772 |
| 8,291,711 | B2* | 10/2012 | Chokshi | F23R 3/06 60/758 |
| 8,387,396 | B2* | 3/2013 | Chen | F01D 9/023 60/752 |
| 8,448,443 | B2* | 5/2013 | Berry | F23R 3/045 60/754 |
| 8,479,518 | B1* | 7/2013 | Chen | F23R 3/002 60/733 |
| 9,046,269 | B2* | 6/2015 | Smith | F01D 5/186 |
| 9,127,551 | B2 | 9/2015 | Narcus et al. | |
| 9,267,687 | B2* | 2/2016 | Khan | F23R 3/002 |
| 9,739,201 | B2* | 8/2017 | Pushkaran | F02C 7/22 |
| 2007/0180827 | A1 | 8/2007 | Dawson et al. | |
| 2009/0145099 | A1 | 6/2009 | Jennings et al. | |
| 2010/0269513 | A1* | 10/2010 | Berry | F23R 3/06 60/772 |
| 2012/0079828 | A1* | 4/2012 | Saitou | F01D 9/023 60/740 |
| 2015/0377134 | A1* | 12/2015 | Maurer | F02C 7/18 60/754 |
| 2016/0333735 | A1* | 11/2016 | Bunker | F23R 3/005 |

FOREIGN PATENT DOCUMENTS

| | | |
|---|---|---|
| JP | 2008169837 A | 7/2008 |
| JP | 2008286199 A | 11/2008 |
| JP | 2011102580 A | 5/2011 |

OTHER PUBLICATIONS

An extended European search report issued by the European Patent Office dated May 11, 2017 in connection with European patent application No. 17151771.7.

Japanese Office Action issued by the Japanese Patent Office dated Sep. 5, 2017 in connection with Japanese patent application No. 2017-010277.

* cited by examiner

TRANSITION PART ASSEMBLY AND COMBUSTOR INCLUDING THE SAME

CROSS-REFERENCE TO RELATED APPLICATION

This application claims priority to Korean Patent Application No. 10-2016-0081029, filed on Jun. 28, 2016, the disclosure of which is incorporated herein by reference in its entirety.

BACKGROUND

Exemplary embodiments of the present disclosure relate to a transition part assembly and a combustor including the same, and more particularly, to a transition part assembly which is improved in efficiency of cooling a high-temperature region formed on a side surface of a transition part of a gas turbine, and a combustor including the same.

A turbine is a machine which generates rotating force from driving force or reaction force using the flow of compressive fluid such as gas. If steam is used, the turbine is called a steam turbine, and if combustion gas is used, it is called a gas turbine.

The gas turbine includes a compressor, a combustor and a turbine. The compressor sucks the atmospheric air, compresses it, and then supplies high-pressure air to the combustor. The combustor generates high-temperature and high-pressure combustion gas. The turbine is driven by combustion gas discharged from the combustor so as to rotate a rotating shaft. The operation principle of the gas turbine includes sucking the atmosphere air, compressing it using the compressor and transferring the compressed air to the combustor, generating high-temperature and high-pressure gas in the combustor, driving the turbine using the high-temperature and high-pressure gas, and then discharging exhaust gas to the atmosphere. In other words, the operation principle of the gas turbine includes a compression step, a heating step, an expansion step, and a heat dissipation step.

The compressor of the gas turbine functions to suck air from the atmosphere and supply air for combustion to the combustor. During an adiabatic compression process in the compressor, the pressure and temperature of air are increased. In the combustor, a constant-pressure combustion process is performed, during which drawn compressed air is mixed with fuel, and a mixture of the compressed air and fuel is combusted to produce combustion gas having high energy.

High-temperature and high-pressure combustion gas discharged from the combustor expands and applies driving force and reaction force to an impeller of the turbine, thus generating mechanical energy. Some of the mechanical energy is supplied as energy required for compressing air in the compressor, and the remaining mechanical energy is used to drive a generator so as to produce electric power.

The combustor of the gas turbine includes a liner unit and a transition part. The liner unit combusts fuel together with compressed air and produces high-temperature compressed gas. The high-temperature compressed gas is drawn into the turbine and expanded to rotate the rotating shaft coupled with the turbine. The transition part is used to transfer combustion gas generated from the combustor liner to the turbine and functions to increase the flow rate of high-temperature gas. The outer surface of the transition part is cooled by compressed air supplied from the compressor so as to prevent the transition part from being damaged by the high-temperature combustion gas.

For this, a perforated sleeve encloses the transition part and is configured such that air discharged from the compressor flows into the perforated sleeve through cooling holes formed in the perforated sleeve and comes into contact with the outer surface of the transition part so as to cool it. Cooling air that has been used to cool the outer surface of the transition part flows along space between the perforated sleeve and the transition part toward the liner unit.

The temperature distribution of the transition part when operating the gas turbine in the related art shows that a high temperature region is formed on the side surface of the transition part.

However, although the transition part is provided with the perforated sleeve enclosing the transition part, there is a problem in that the efficiency of cooling the transition part is not satisfied because a sufficient amount of cooling air is not supplied to the side surface of the transition part.

Therefore, the transition part is not effectively cooled, so that there is a risk of the transition part being damaged by high-temperature combustion gas, and the efficiency and lifetime of the gas turbine are reduced.

BRIEF SUMMARY

An object of the present disclosure is to provide a transition part assembly which is improved in efficiency of cooling a high-temperature region formed on a side surface of a transition part of a gas turbine, and a combustor including the same.

Other objects and advantages of the present disclosure can be understood by the following description, and become apparent with reference to the embodiments of the present disclosure. Also, it is obvious to those skilled in the art to which the present disclosure pertains that the objects and advantages of the present invention can be realized by the apparatus and methods as claimed and combinations thereof.

In accordance with one aspect of the present disclosure, a transition part assembly includes: a transition part that couples a combustor liner with a turbine; a collision sleeve that surrounds the transition part; a cooling hole defined in the collision sleeve; and a guide provided in the collision sleeve and that guides air to a side surface of the transition part.

The guide may be disposed adjacent to the cooling hole.

The guide may protrude inward from the collision sleeve.

The guide may include a tapered surface that is inclined toward the side surface of the transition part.

The guide may be include a stepped surface disposed towards in an inner surface of the collision sleeve.

The stepped surface may include a stair shape.

The stepped surface may be rounded.

The collision sleeve may enclose the transition part.

In accordance with another aspect of the present disclosure, a combustor includes: a combustor liner that mixes compressed air with fuel and combusts a mixture of the compressed air and the fuel; a transition part that couples the combustor liner with a turbine; a collision sleeve that surrounds the transition part; a cooling hole defined in the collision sleeve; and a guide provided in the collision sleeve that guides air to a side surface of the transition part.

The guide may be disposed adjacent to the cooling hole.

The guide may protrude inward from the collision sleeve.

The guide may include a tapered surface that is inclined toward the side surface of the transition piece.

The guide may include a stepped surface disposed towards in an inner surface of the collision sleeve.

The stepped surface may include a stair shape.

The stepped surface may be rounded.

The collision sleeve may enclose the transition part.

It is to be understood that both the foregoing general description and the following detailed description of the present disclosure are exemplary and explanatory and are intended to provide further explanation of the invention as claimed.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Hereinafter, various embodiments of a transition part assembly and a combustor including the same according to the present disclosure will be described with reference to FIGS. 1 to 6.

Figure 1:
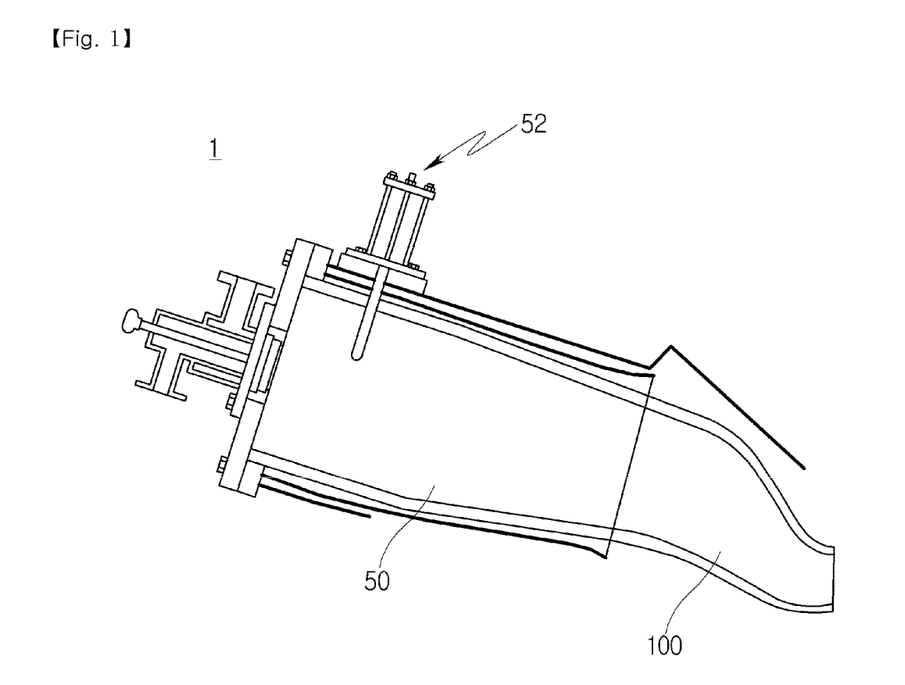
FIG. 1 is a side view schematically illustrating a combustor of a gas turbine.
Figure 2:
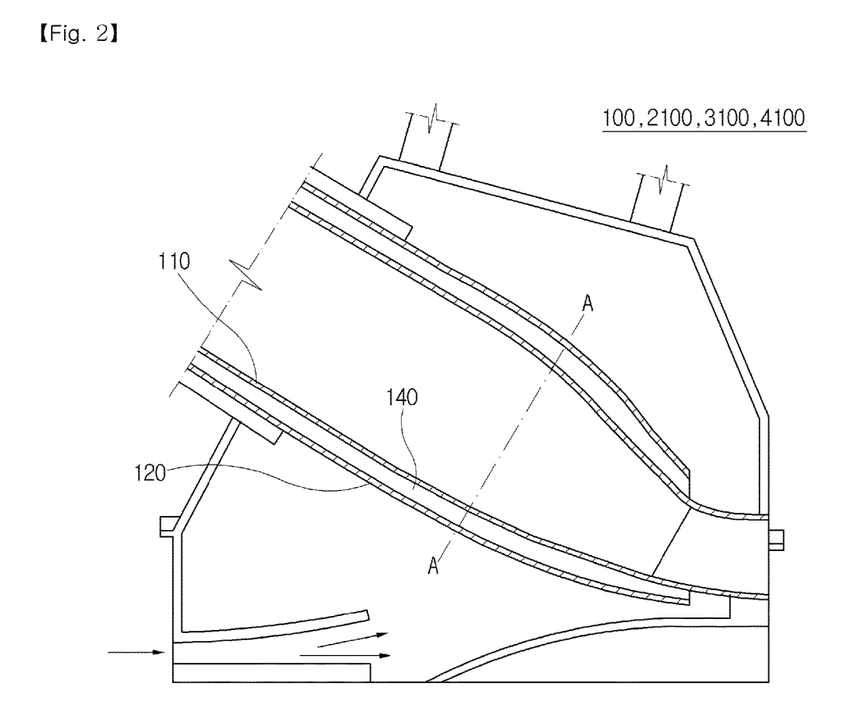
FIG. 2 is a side sectional view illustrating a transition part assembly according to a first embodiment of the present disclosure.
Figure 3:
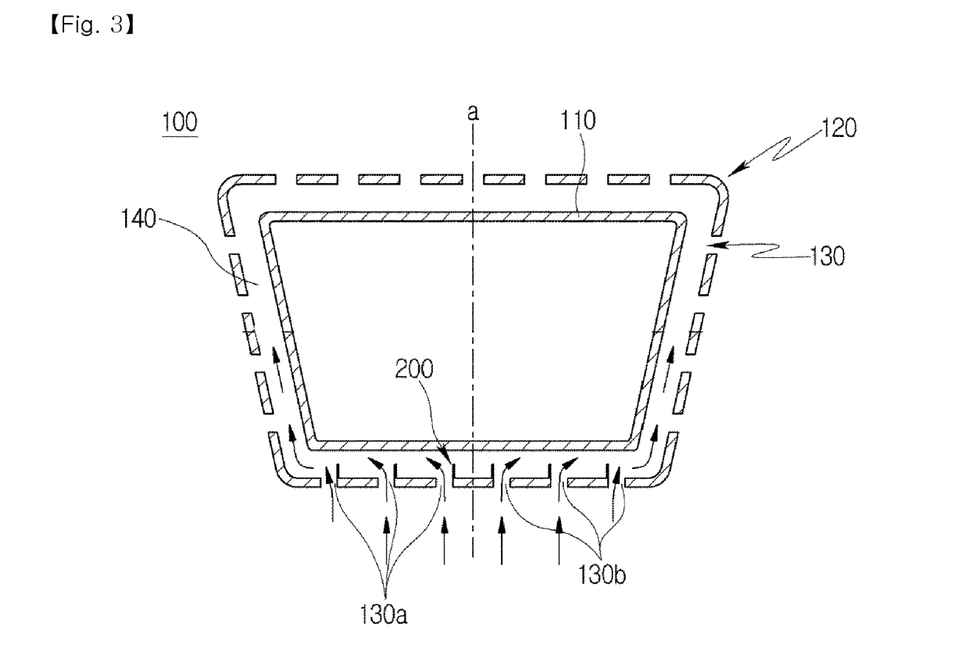
FIG. 3 is a sectional view taken along line A-A of FIG. 2.
Figure 4:
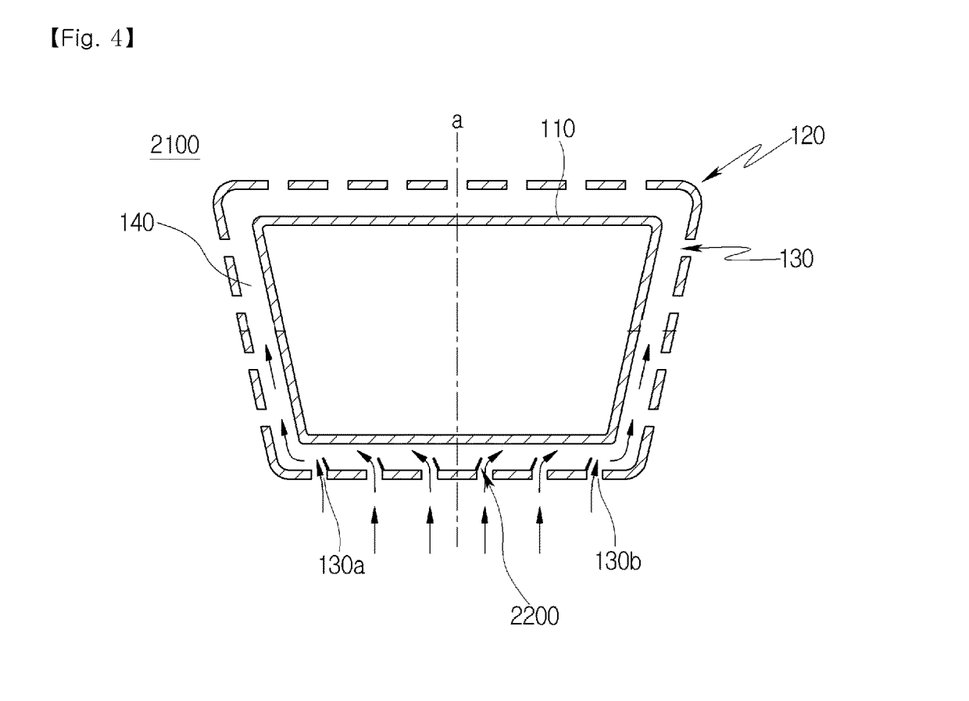
FIG. 4 is a sectional view illustrating a transition part assembly according to a second embodiment of the present disclosure.
Figure 5:
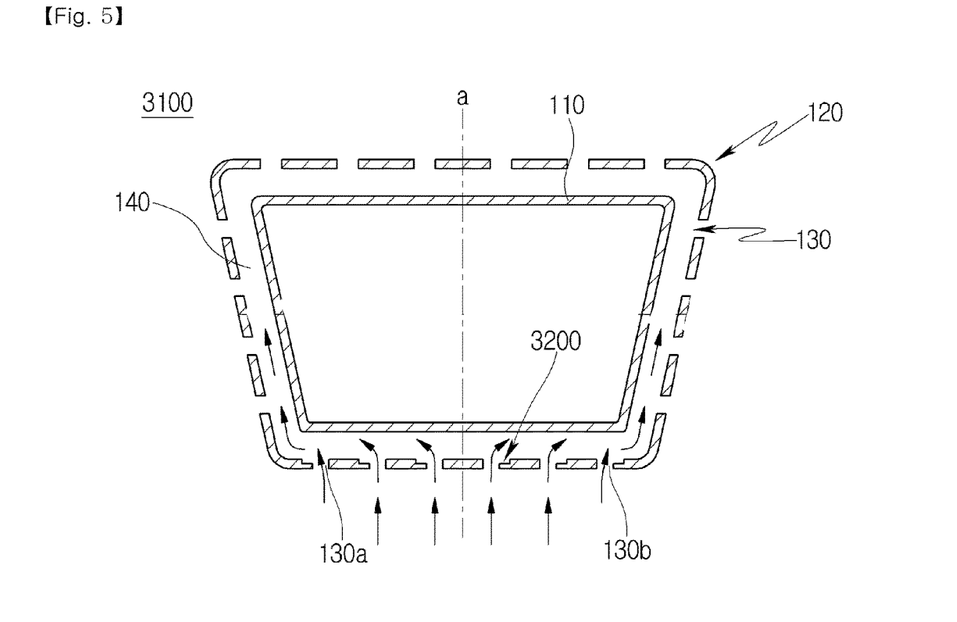
FIG. 5 is a sectional view illustrating a transition part assembly according to a third embodiment of the present disclosure.
Figure 6:
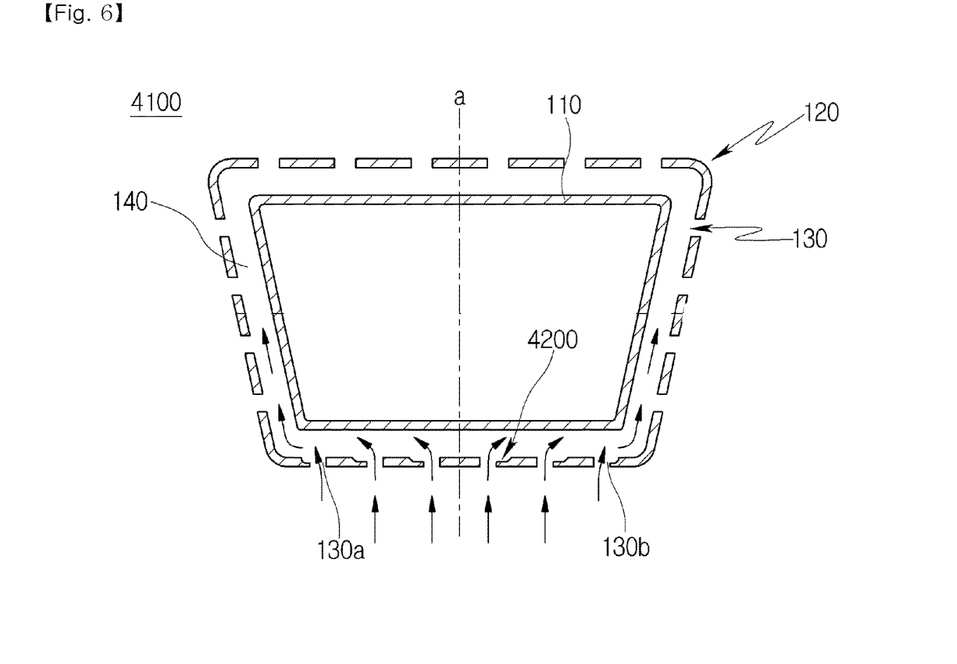
FIG. 6 is a sectional view illustrating a transition part assembly according to a fourth embodiment of the present disclosure.

FIG. 1 is a side view schematically illustrating a combustor of a gas turbine. FIG. 2 is a side sectional view illustrating a transition part assembly according to a first embodiment of the present disclosure. FIG. 3 is a sectional view taken along line A-A of FIG. 2. FIG. 4 is a sectional view illustrating a transition part assembly according to a second embodiment of the present disclosure. FIG. 5 is a sectional view illustrating a transition part assembly according to a third embodiment of the present disclosure. FIG. 6 is a sectional view illustrating a transition part assembly according to a fourth embodiment of the present disclosure.

The configuration of the gas turbine in which the transition part assembly according to the present disclosure is installed may be similar that of the conventional gas turbine as modified according to the below discussion.

First, the transition part assembly and the combustor including the same according to the first embodiment of the present disclosure will be described with reference to FIGS. 1 to 3.

FIG. 1 schematically illustrates the combustor 1 of the gas turbine. The combustor 1 of the gas turbine includes an ignition unit 52, a combustor liner 50, and the transition part assembly 100. The ignition unit 52 is a part for igniting fuel. The combustion liner 50 is a part for combusting fuel together with compressed air and producing high-temperature compressed gas. The configurations of the ignition unit 52 and the combustor liner 50 of the combustor 1 according to the present disclosure may be the same as those of a typical ignition unit and combustor liner. The transition part assembly 100 will now be described in detail.

The transition part assembly 100 is provided to transfer combustion gas generated from the combustor liner 50 to the turbine and functions to increase the flow rate of high-temperature gas.

High-temperature and high-pressure combustion gas discharged from the combustor 1 is drawn into the turbine (not shown), and expands in the turbine and applies driving force and reaction force to an impeller of the turbine, thus generating mechanical energy. Some of the mechanical energy is supplied as energy required for compressing air in a compressor, and the remaining mechanical energy is used to drive a generator so as to produce electric power.

As shown in FIGS. 2 and 3, the transition part assembly 100 for a gas turbine according to the first embodiment of the present disclosure includes a transition part 110 which couples a turbine with the combustor liner 50 of the gas turbine, a collision sleeve 120 that encloses the transition part 110, cooling holes 130 that are formed in the collision sleeve 120, and guides 200 that are provided inside the collision sleeve 120 so as to guide air toward side surfaces of the transition part 110.

The transition part 110 has a tubular shape and couples the turbine with the combustor liner 50 of the gas turbine. The transition part 110 functions to transfer combustion gas generated from the combustion liner 50 to the turbine. Combustion gas is increased in flow rate by the transition part 110 and flows into the turbine at a high flow rate. The transition part 110 may have various shapes, e.g., a cylindrical shape, a rectangular shape, etc. corresponding to the cross-sectional shape of the combustion liner. Preferably, a first end of the transition part 110 that is coupled with the combustion liner has the same shape as the cross-sectional shape of the combustion liner that faces the first end of the transition part 110, and a second end thereof that is coupled with the turbine side has the same shape as the cross-sectional shape of the turbine that faces the second end of the transition part 110.

In the present embodiment, the first end of the transition part 110 is coupled to the combustion liner 50, but in some embodiments, a separate connector may be disposed between the first end of the transition part 110 and the combustion liner 50.

The collision sleeve 120 may have a cylindrical shape and enclose the transition part 110 at a position spaced apart from the transition part 110 in a radial direction. Therefore, a space 140 is formed between the transition part 110 and the collision sleeve 120. The cooling holes 130 are formed in all surfaces of the collision sleeve 120, and the cooling holes 130 may be arranged along a plurality of rows. Each hole 130 may have a circular or elliptical shape.

The guides 200 are provided inside the collision sleeve 120 and function to guide air toward the side surfaces of the transition part 110. The guides 200 are formed around the cooling holes 130. In the first embodiment, the guides 200 protrude inward from the inner surface of the collision sleeve 120.

As shown in FIG. 3, the guides 200 are provided on an inner surface of a lower plate of the collision sleeve 120 and formed around the corresponding cooling holes 130. Each guide 200 is formed in a protrusion shape such that cooling air drawn through the cooling holes 130 is guided toward the outer side surfaces of the transition part 110. Moreover, referring to a cross section (A-A) of the transition part assembly 100, the guides 200 are configured such that cooling air that is drawn into left cooling holes 130a disposed at the left side based on a center line (a) with respect to the left and right direction is guided toward the left side surface of the transition part 110, while cooling air that is drawn into right cooling holes 130b disposed at the right side is guided toward the right side surface of the transition part 110.

For this, in the case of the left cooling holes 130a, each guide 200 protrudes and forms a wall on an edge of portion of the collision sleeve that is disposed at the right side of the corresponding cooling hole 130a. Thereby, cooling air drawn into each left cooling hole 130a is prevented from being moved to the right by the corresponding guide 200 protruding at the right side of the left cooling hole 130a, whereby most of the cooling air is guided to be moved to the left. In the case of the right cooling holes 130b, each guide 200 protrudes and forms a wall on an edge of portion of the collision sleeve that is disposed at the left side of the corresponding cooling hole 130a. Thereby, cooling air drawn into each right cooling hole 130b is prevented from being moved to the left by the corresponding guide 200 protruding at the left side of the right cooling hole 130b, whereby most of the cooling air is guided to be moved to the right.

Therefore, cooling air is focused toward the left and right sides of the transition part 110 so that the quantity of air flowing on the left and right side surfaces of the transition part 110 is increased, and the rate at which cooling air is drawn onto the side surfaces of the transition part 110 is also increased. Hence, high-temperature regions that are formed on the side surfaces of the transition part 110 can be effectively cooled. For reference, the flow path of cooling air is represented by the arrows in FIG. 3.

Hereinbelow, the configuration of a transition part assembly 2100 of a gas turbine according to a second embodiment of the present disclosure will be described with reference to FIG. 4. The general configuration of the transition part assembly 2100 according to the second embodiment, other than the shape of a guide, is the same as that of the transition part assembly 100 according to the first embodiment. Therefore, descriptions of the transition part 110, the collision sleeve 120 and the cooling holes 130 will be omitted, and the following description will be focused on the guide having a different configuration from that of the first embodiment.

As shown in FIG. 4, guides 2200 according to the second embodiment are provided on an inner surface of a lower plate of the collision sleeve 120 and formed around the corresponding cooling holes 130. Each of the guides 2200 is formed in a protrusion shape such that cooling air drawn into the cooling holes 130 is guided toward the outer side surfaces of the transition part, in a manner similar to that of the transition part assembly according to the first embodiment. However, in the second embodiment, each guide 2200 protrudes to form a tapered surface that is inclined toward the corresponding side surface of the transition part 110. Moreover, referring to a cross section (A-A) of the transition part assembly 2100, the guides 2200 are configured such that cooling air that is drawn into left cooling holes 130a disposed at the left side based on the center line (a) with respect to the left and right direction is guided toward the left side surface of the transition part 110, while cooling air that is drawn into right cooling holes 130b disposed at the right side is guided toward the right side surface of the transition part 110.

For this, in the case of the left cooling holes 130a, each guide 2200 protrudes and forms a wall on an edge of portion of the collision sleeve that is disposed at the right side of the corresponding cooling hole 130a. The guide 2200 is formed in a shape in which it is inclined toward the left side surface of the transition part 110. Thereby, cooling air drawn into each left cooling hole 130a is limited from being moved to the right by the corresponding guide 2200 protruding at the right side of the left cooling hole 130a, whereby most of the cooling air is guided to be moved to the left. Moreover, because each associated guide 2200 forms a tapered surface that is inclined toward the left side surface of the transition part 110, cooling air can be more easily moved toward the left side surface of the transition part 110. For this, in the case of the right cooling holes 130b, each guide 2200 protrudes and forms a wall on an edge of portion of the collision sleeve that is disposed at the left side of the corresponding cooling hole 130a. The guide 2200 is formed in a shape in which it is inclined toward the right side surface of the transition part 110. Thereby, cooling air drawn into each right cooling hole 130b is prevented from being moved to the left by the corresponding guide 2200 protruding at the left side of the right cooling hole 130b, whereby most of the cooling air is moved to the right. Moreover, because each associated guide 2200 forms a tapered surface that is inclined toward the right side surface of the transition part 110, cooling air can be more easily moved toward the right side surface of the transition part 110.

Therefore, cooling air is focused toward the left and right sides of the transition part 110 so that the quantity of air flowing on the left and right side surfaces of the transition part 110 is increased, and the rate at which cooling air is drawn onto the side surfaces of the transition part 110 is also increased. Hence, high-temperature regions that are formed on the side surfaces of the transition part 110 can be effectively cooled. For reference, the flow path of cooling air is represented by the arrows in FIG. 4.

Hereinbelow, the configuration of a transition part assembly 3100 of a gas turbine according to a third embodiment of the present disclosure will be described with reference to FIG. 5. The general configuration of the transition part assembly 3100 according to the third embodiment, other than the shape of a guide, is the same as that of the transition part assembly 100 according to the first embodiment. Therefore, descriptions of the transition part 110, the collision sleeve 120 and the cooling holes 130 will be omitted, and the following description will be focused on the guide having a different configuration from that of the first embodiment.

As shown in FIG. 5, guides 3200 according to the third embodiment are provided on an inner surface of a lower plate of the collision sleeve 120 and formed around the corresponding cooling holes 130. Each guide 3200 is formed to have a stepped surface that is disposed towards in the inner surface of the collision sleeve 120 such that cooling air drawn through the cooling holes 130 is guided toward the outer side surfaces of the transition part 110. Moreover, referring to a cross section (A-A) of the transition part assembly 3100, the guides 3200 are configured such that cooling air that is drawn into left cooling holes 130a disposed at the left side based on the center line (a) with respect to the left and right direction is guided toward the left side surface of the transition part 110, while cooling air that is drawn into right cooling holes 130b disposed at the right side is guided toward the right side surface of the transition part 110.

In the present embodiment, the stepped surface of each guide 3200 has a stair shape. In detail, in the case of the left cooling holes 130a, a depression is formed in an edge of a portion of the collision sleeve that is disposed at the left side of each cooling hole so that the stepped surface is formed in such a way that the portion of the collision sleeve is increased in thickness from the right to the left. Thereby, in the case of each left cooling hole 130a, the thickness of a portion of the collision sleeve that is disposed at the left side of the left cooling hole 130a is less than that of a portion of the collision sleeve that is disposed at the right side of the left cooling hole 130a. Therefore, this structure can provide the same effect as that of the structure in which the wall protrudes at the right side of the left cooling hole 130a, like that in the guide 200 of the transition part assembly according to the first embodiment. As a result, cooling air drawn into the left cooling hole 130a is limited from being moved to the right, whereby most of the cooling air can be guided to be moved to the left along the guide 3200 disposed at the left side of the left cooling hole 130a.

Furthermore, in the case of the right cooling holes 130b, a depression is formed in an edge of a portion of the collision sleeve that is disposed at the right side of each cooling hole so that the stepped surface is formed in such a way that the portion of the collision sleeve is increased in thickness from the left to the right. Thereby, in the case of each right cooling hole 130b, the thickness of a portion of the collision sleeve that is disposed at the right side of the right cooling hole 130b is less than that of a portion of the collision sleeve that is disposed at the left side of the right cooling hole 130b. Therefore, this structure can provide a similar effect as that of the structure in which the wall protrudes at the left side of the right cooling hole 130b, like that in the guide 200 of the transition part assembly according to the first embodiment. As a result, cooling air drawn into the right cooling hole 130b is limited from being moved to the left, whereby most of the cooling air can be guided to be moved to the right along the guide 3200 disposed at the right side of the right cooling hole 130b.

Therefore, cooling air is focused toward the left and right sides of the transition part 110 so that the quantity of air flowing on the left and right side surfaces of the transition part 110 is increased, and the rate at which cooling air is drawn onto the side surfaces of the transition part 110 is also increased. Hence, high-temperature regions that are formed on the side surfaces of the transition part 110 can be effectively cooled. For reference, the flow path of cooling air is represented by the arrows in FIG. 5.

Hereinbelow, the configuration of a transition part assembly 4100 of a gas turbine according to a fourth embodiment of the present disclosure will be described with reference to FIG. 6. The general configuration of the transition part assembly 4100 according to the fourth embodiment, other than the shape of a guide, is the same as that of the transition part assembly 3100 according to the third embodiment. Therefore, descriptions of the transition part 110, the collision sleeve 120 and the cooling holes 130 will be omitted, and the following description will be focused on the guide having a different configuration from that of the third embodiment.

As shown in FIG. 6, guides 4200 according to the fourth embodiment are provided on an inner surface of a lower plate of the collision sleeve 120 and formed around the corresponding cooling holes 130. Each of the guides 4200 is formed to have a stepped surface that is disposed towards in the inner surface of the collision sleeve 120 such that cooling air drawn through the cooling holes 130 is guided toward the outer side surfaces of the transition part 110, in a manner similar to that of the transition part assembly according to the third embodiment. However, in the fourth embodiment, the stepped surface of each guide 4200 has a round shape. Moreover, referring to a cross section (A-A) of the transition part assembly 4100, the guides 3200 are configured such that cooling air that is drawn into left cooling holes 130a disposed at the left side based on the center line (a) with respect to the left and right direction is guided toward the left side surface of the transition part 110, while cooling air that is drawn into right cooling holes 130b disposed at the right side is guided toward the right side surface of the transition part 110. Moreover, the guide 4200 may have a shape in which the thickness thereof is increased from the center line (a) of the transition part assembly to the opposite sides such that drawn cooling air can be guided to the outer side surfaces of the transition part 110.

In the present embodiment, the stepped surface of the guide 4200 has a round shape. In detail, in the case of the left cooling holes 130a, a depression is formed in an edge of a portion of the collision sleeve that is disposed at the left side of the cooling hole. The depression may be rounded in a concave shape. Hence, the stepped surface is formed such that the thickness of the collision sleeve is gradually increased from the right to the left. In this regard, the shape of the depression is not limited to a concave shape. That is, the depression may have any rounded shape, e.g., a convex shape, a wave shape, etc. Thereby, in the case of each left cooling hole 130a, the thickness of a portion of the collision sleeve that is disposed at the left side of the left cooling hole 130a is less than that of a portion of the collision sleeve that is disposed at the right side of the left cooling hole 130a. Therefore, this structure can provide the same effect as that of the structure in which the wall protrudes at the right side of the left cooling hole 130a, like that in the guide 200 of the transition part assembly according to the first embodiment. As a result, cooling air drawn into the left cooling hole 130a is prevented from being moved to the right, whereby most of the cooling air can be guided to be moved to the left along the guide 4200 disposed at the left side of the left cooling hole 130a. Moreover, since the guide 4200 has a stepped surface which has a round shape and is gradually increased in thickness, cooling air can be more reliably guided without loss of energy compared to a sharply stepped surface.

In detail, in the case of the right cooling holes 130b, a depression is formed in an edge of a portion of the collision sleeve that is disposed at the right side of the cooling hole. The depression may be rounded in a concave shape. Hence, the stepped surface is formed such that the thickness of the collision sleeve is gradually increased from the left to the right. In this regard, the shape of the depression is not limited to a concave shape. That is, the depression may have any rounded shape, e.g., a convex shape, a wave shape, etc. Thereby, in the case of each right cooling hole 130b, the thickness of a portion of the collision sleeve that is disposed at the right side of the right cooling hole 130b is less than that of a portion of the collision sleeve that is disposed at the left side of the right cooling hole 130b. Therefore, this structure can provide the same effect as that of the structure in which the wall protrudes at the left side of the right cooling hole 130b, like that in the guide 200 of the transition part assembly according to the first embodiment. As a result, cooling air drawn into the right cooling hole 130b is prevented from being moved to the left, whereby most of the cooling air can be guided to be moved to the right along the guide 4200 disposed at the right side of the right cooling hole 130b. Moreover, since the guide 4200 has a stepped surface which has a round shape and is gradually increased in thickness, cooling air can be more reliably guided without loss of energy compared to a sharply stepped surface.

Therefore, cooling air is focused toward the left and right sides of the transition part 110 so that the quantity of air flowing on the left and right side surfaces of the transition part 110 is increased, and the rate at which cooling air is drawn onto the side surfaces of the transition part 110 is also increased. Hence, high-temperature regions that are formed on the side surfaces of the transition part 110 can be effectively cooled. For reference, the flow path of cooling air is represented by the arrows in FIG. 6.

Hereinafter, a process in which the transition part 110 is cooled in the transition part assembly 100, 2100, 3100 or 4100 of the gas turbine according to the present disclosure will be described briefly.

Because combustion gas combusted in the combustor liner 50 is gas having a very high temperature of approximately 1500° C., the outer surface of the transition part 110 must be cooled by compressed air supplied from the compressor so as to prevent the transition part 110 from being damaged by the high-temperature combustion gas.

Compressed cooling air discharged from the compressor enters the space 140 between the transition part 110 and the collision sleeve 120 through the plurality of cooling holes 130 formed in the collision sleeve 120 and comes into contact with the outer surface of the transition part 110, thus cooling the outer surface of the transition part 110. In this regard, cooling air that is drawn through the cooling holes disposed in the lower plate of the collision sleeve 120 is guided by the guides 200, 2200, 3200 or 4200 formed in the inner surface of the lower plate of the collision sleeve 120. Cooling air drawn through the left cooling holes 130a is guided to the left side surface of the transition part 110, and cooling air drawn through the right cooling holes 130b is guided to the right side surface of the transition part 110.

As such, cooling air is guided to the side surfaces of the transition part 110 by the guides 200, 2200, 3200 or 4200, so that the rate at which air is drawn onto the side surfaces of the transition part 110 is increased. Thus, the pressure in the collision sleeve 120 is reduced by an increase in flow rate such that low pressure is formed in the collision sleeve 120 compared to the air outside the collision sleeve 120, whereby air can be more smoothly drawn into the collision sleeve. As a result, the efficiency of cooling high-temperature regions that are formed on the side surfaces of the transition part 110 can be enhanced.

Cooling air used to cool the outer surface of the transition part 110 in the space 140 between the transition part 110 and the collision sleeve 120 moves to a space formed around the combustion liner 150 and then also cools the outer surface of the combustion liner 150 before being mixed with combustion gas in the combustor.

As described above, in a transition part assembly and a combustor including the same according to the present disclosure, a guide is formed inside a collision sleeve so as to guide air to a side surface of a transition part. Thus, the rate at which cooling air is drawn onto the side surface of the transition part is increased, whereby a high-temperature region of the transition part can be efficiently cooled.

As the efficiency of cooling the transition part is improved, the risk of the transition part assembly being damaged by high-temperature combustion gas is reduced, and the efficiency and lifetime of a gas turbine are increased.

While the present disclosure has been provided with respect to the specific embodiments, it will be apparent to those skilled in the art that various changes and modifications may be made without departing from the spirit and scope of the following claims.

Moreover, the above advantages and features are provided in described embodiments, but shall not limit the application of the claims to processes and structures accomplishing any or all of the above advantages.

What is claimed is:

1. A transition part assembly comprising:
a transition part configured to couple a combustor liner with a turbine;
a collision sleeve that surrounds the transition part and includes a lower plate divided into left and right sides along an imaginary center line passing through the transition part, the lower plate defining a plurality of cooling holes arranged on either side of the imaginary center line to introduce cooling air through the lower plate into a space between the collision sleeve and the transition part, the plurality of cooling holes including a plurality of first cooling holes arranged on the left side of the imaginary center line and a plurality of second cooling holes arranged on the right side of the imaginary center line; and
a plurality of guides provided on an inner surface of the lower plate of the collision sleeve to guide the cooling air to side surfaces of the transition part, the plurality of guides including
a first guide disposed along an edge of each the plurality of first cooling holes arranged on the left side of the lower plate of the collision sleeve and configured to guide the cooling air to the side surfaces on the left side of the transition part, wherein the first guide is disposed only on a near edge of the first cooling hole and directs the introduced cooling air away from the first guide in a first direction away from the imaginary center line, and
a second guide disposed along an edge of each the plurality of first cooling holes arranged on the right side of the lower plate of the collision sleeve and configured to guide the cooling air to the side surfaces on the right side of the transition part, wherein the second guide is disposed only on a near edge of the second cooling hole and directs the introduced cooling air away from the second guide in a second direction away from the imaginary center line,
wherein the near edge of the first cooling hole is an edge disposed toward the imaginary center line, and the near edge of the second cooling hole is an edge disposed toward the imaginary center line.

2. The transition part assembly according to claim 1,
wherein the plurality of guides respectively disposed on the cooling hole edges are formed as walls that have flat surfaces facing respective cooling holes of the plurality of cooling holes and that protrude inward from the inner surface of the lower plate of the collision sleeve, and
wherein each wall leans from the near edge of the respective cooling holes toward an opposite edge of the respective cooling holes to direct the introduced cooling air away from the flat surfaces of each guide and toward the side surfaces of the transition part beyond the opposite edge.

3. The transition part assembly according to claim 2,
wherein each wall includes a base and a distal end and is inclined such that the distal end is farther away from the imaginary center line than the base, and
wherein each wall has a second surface that is disposed opposite to the flat surface, the second surface leaning from the corresponding edge of the respective cooling holes toward the opposite edge of the respective cooling holes.

4. A transition part assembly comprising:
a transition part configured to couple a combustor liner with a turbine;

a collision sleeve that surrounds the transition part and includes a lower plate divided into left and right sides along an imaginary center line passing through the transition part, the lower plate defining a plurality of cooling holes arranged on either side of the imaginary center line to introduce cooling air through the lower plate into a space between the collision sleeve and the transition part;

a first guide disposed adjacent to a first cooling hole of the plurality of cooling holes arranged on the left side of the imaginary center line and configured to guide the introduced cooling air to a left side surface of the transition part, wherein the first guide is disposed only on a far edge of the first cooling hole and draws the introduced cooling air toward the first guide in a first direction away from the imaginary center line; and a second guide disposed adjacent to a second cooling hole of the plurality of cooling holes arranged on the right side of the imaginary center line and configured to guide the introduced cooling air to a right side surface of the transition part, wherein the second guide is disposed only on a far edge of the second cooling hole and draws the introduced cooling air toward the second guide in a second direction away from the imaginary center line, wherein the far edge of the first cooling hole is an edge disposed away from the imaginary center line, and the far edge of the second cooling hole is an edge disposed away from the imaginary center line.

5. A combustor comprising:

a combustor liner in which a mixture of compressed air and fuel is combusted;

a transition part coupled to the combustor liner and configured to be coupled to a turbine;

a collision sleeve that surrounds the transition part and includes a lower plate divided into left and right sides along an imaginary center line passing through the transition part, the lower plate defining a plurality of cooling holes arranged on either side of the imaginary center line to introduce cooling air through the lower plate into a space between the collision sleeve and the transition part, the plurality of cooling holes including a plurality of first cooling holes arranged on the left side of the imaginary center line and a plurality of second cooling holes arranged on the right side of the imaginary center line; and a plurality of guides provided on an inner surface of the lower plate of the collision sleeve to guide the cooling air to side surfaces of the transition part, the plurality of guides including a first guide disposed along an edge of each the plurality of first cooling holes arranged on the left side of the lower plate of the collision sleeve and configured to guide the cooling air to the side surfaces on the left side of the transition part, wherein the first guide is disposed only on a near edge of the first cooling hole and directs the introduced cooling air in a first direction away from the imaginary center line, and a second guide disposed along an edge of each the plurality of first cooling holes arranged on the right side of the lower plate of the collision sleeve and configured to guide the cooling air to the side surfaces on the right side of the transition part, wherein the second guide is disposed only on a near edge of the second cooling hole and directs the introduced cooling air in a second direction away from the imaginary center line, wherein the near edge of the first cooling hole is an edge disposed toward the imaginary center line, and the near edge of the second cooling hole is an edge disposed toward the imaginary center line.

6. The transition part assembly according to claim 1, wherein the imaginary center line is drawn parallel to a direction of the cooling air passing through the lower plate and separates the lower plate into a left side through which the cooling air enters the plurality of first cooling holes and a right side through which the cooling air enters the plurality of second cooling holes.

7. The transition part assembly according to claim 4, wherein the plurality of guides are defined by a shape of a recess formed on the inner surface of the lower plate of the collision sleeve to draw the introduced cooling air toward the guide.

8. The transition part assembly according to claim 7, wherein each of the plurality of guides includes a stepped surface.

9. The transition part assembly according to claim 8, wherein the stepped surface is formed of thin and thick portions of the lower plate of the collision sleeve such that the thick portion is farther away from the imaginary center line than the thin portion.

10. The transition part assembly according to claim 9, wherein the lower plate of the collision sleeve has a thickness that gradually changes from the thin portion to the thick portion.

* * * * *